July 7, 1936.  R. F. STRICKLAND  2,047,043
MOLDING PROCESS AND ARTICLE PRODUCED THEREBY
Filed July 13, 1932
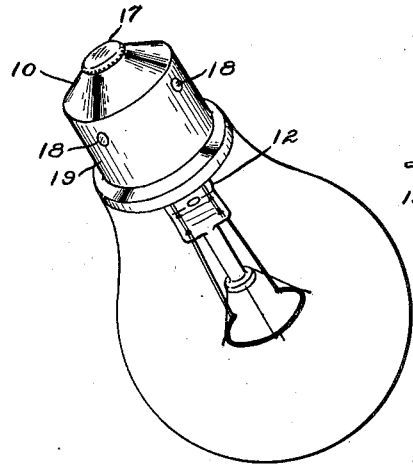
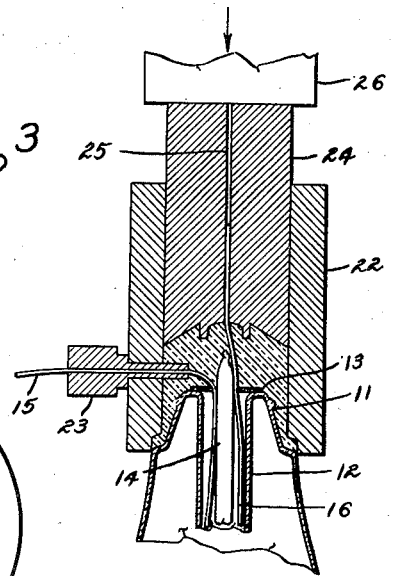
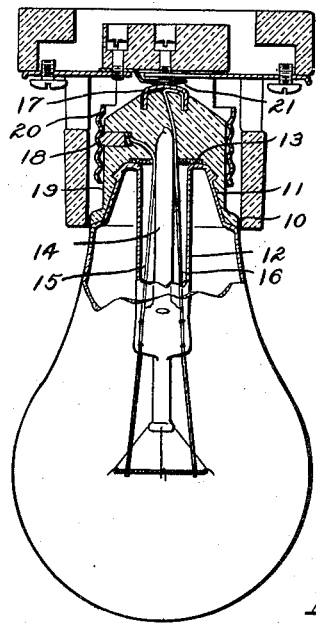
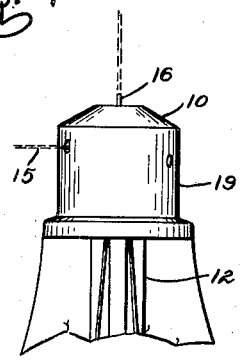
INVENTOR:
ROYAL F. STRICKLAND,
BY Charles E. Tullar
HIS ATTORNEY.

Patented July 7, 1936

2,047,043

UNITED STATES PATENT OFFICE 2,047,043

MOLDING PROCESS AND ARTICLE PRODUCED THEREBY

Royal F. Strickland, Cleveland Heights, Ohio, assignor to General Electric Company, a corporation of New York Application July 13, 1932, Serial No. 622,267

6 Claims. (Cl. 18—59)

My invention relates to the manufacture of articles from synthetic resin and more particularly to the manufacture of articles comprising a part made of synthetic resin molded upon another part made of a fragile material like glass. Still more particularly, my invention relates to the manufacture of electric lamps and other electrical devices comprising a bulb of vitreous material such as glass, to which is united a base composed principally of synthetic resin. My invention relates to the product as well as to the process of such manufacture.

According to my invention, a mixture of the resinous material is placed in the mold, and then pressure is applied to compact the said material. Although various synthetic resin materials, such as that commercially known as bakelite, are more or less desirable for this purpose, I prefer to use a synthetic resin material, known commercially as Durite. This is a furfural or phenol formaldehyde condensation compound which is mixed with a hardening agent such as hexamethylenetetramine. With the synthetic resin material and hardener, I mix a filler consisting of a non-compressible material preferably marble flour. I have found that while various absorbent materials such as wood flour or asbestos are ordinarily used in conjunction with synthetic resins, it has been customary to apply very high pressures during the molding operation, such pressures running from one thousand to two thousand pounds per square inch. By the use of a non-compressible material such as the marble flour, I have found that it is not necessary to use these high pressures, and that pressures of not more than fifty pounds per square inch produce excellent results. Ordinarily pressures of from fifteen to one hundred and fifty pounds per square inch may be used. Various other inorganic materials such as finely divided silica, alumina, magnesia, etc., may be used instead of the marble flour. It will be apparent that where the manufactured article comprises a fragile part such as a bulb, the use of very high pressures is practically impossible, and the advantages of my invention which involves the use of low pressures will be apparent.

In order to harden the molded material it is necessary to apply heat and this may be done just before, during or after the pressing operation. It should be timed however so that the material is still plastic when the pressure is applied.

My invention also comprises the article thus produced, particularly a fragile article having a part united thereto consisting of such molded material. Still more specifically, my invention comprises an electric lamp or other electrical device having a bulb with a base united thereto with the lead-in conductors connected to contact terminals in the base. My invention has also to do with the formation of said terminals and their connection with the lead-in conductors. Still more specifically, my invention provides a construction comprising a base with such contact terminals that it may be readily inserted in an ordinary socket such as the well known screw-threaded type. Various other features and advantages of my invention will appear from the following description of a species thereof and from the accompanying drawing.

In the drawing Fig. 1 is a perspective view of an incandescent lamp embodying a base made according to my invention; Fig. 2 is a vertical sectional view of the based lamp mounted in a socket; Fig. 3 is a sectional view of the base mold and a portion of the lamp in position during the molding of the base; Fig. 4 is a side elevation of the molded base before the attachment of the contacts or terminals.

The specific embodiment of my invention shown comprises the base 10 surrounding the seal 11 of the lamp and molded directly thereto. The material from which the base is molded is preferably a mixture of a synthetic resin, preferably Durite, with a hardening agent, preferably hexamethylenetetramine, and a filler such as marble flour which produces a strong body resistant to weathering. This material adheres well to glass when molded under pressure of preferably about fifty pounds per square inch. To prevent the material from entering the hollow stem 12, the latter is closed off by a washer 13 apertured to pass over the exhaust tube 14 and portions of the leading-in wires 15 and 16. The lead wire 16 extends through the molded body and its end is electrically connected to terminal cap 17 which clamps the wire between itself and the molded body. As shown, the rim of the said cap is corrugated to make it flexible and is forced into a circular groove in the end of the molded body against the lead wire end. The lead wire 15 is clamped against the molded body by pin 18 which is forced into a side aperture therein. There are provided a plurality of such pins, preferably three or more, in apertures in the molded body 19 arranged along the line of a helix which corresponds to that of the screw thread in the shell 20 of the socket into which the base is screwed although only one of the pins is connected to a lead wire. The pins which are substantially cylindrical have one end rounded to fit the screw thread of the socket to facilitate insertion of the base in the socket with a minimum of wear and to secure good electrical contact. The diameter of the cylindrical molded body 19 is preferably such that it makes a fairly close fit in the socket so that the lamp will not wobble. The end terminal 17 is engaged by spring finger 21 of the socket.

My method of manufacture consists in first placing washer 13 over the exhaust tube 14 and leading-in wires 15 and 16 and inserting the seal portion 11 into the mold 22. As the latter operation is performed, leading-in wire 15 is threaded through a longitudinal passage in side core 23 and leading-in wire 16 is caused to take a substantially upright position. Side core 23 and two other cores (not shown) used in this instance, which are placed substantially 120° apart about the mold and which differ from the former only in the elimination of the passage provided in the former for the leading-in wire, are now moved inward to the position shown. The molding compound is then added through the open end of the mold and is shaped, compacted and distributed to all parts of the mold by pressure applied to the movable end piece. Leading-in wire 16 extends through a central axial passage 25 in mold end piece 24. Pressure of about fifty pounds per square inch is applied to mold end piece 24, preferably by ram 26. Heat is applied, preferably about 160° C., to cause the material to harden after it has been pressed. The heating may be started, however, even before the pressing operation. In order to finish the base, the leading-in wires are cut short as shown and terminal cap 17 and pins 18 inserted. The cap 17 is provided with a corrugated rim which fits snugly into a circular groove in the molded body. The pins 18 fit snugly in the holes cored therein by the side cores.

What I claim as new and desire to secure by Letters Patent of the United States, is:

1. The method of manufacturing an article comprising a fragile portion which consists in placing in a mold surrounding said portion of said article a material comprising a synthetic resin, a hardening agent, and a non-compressible filler and applying a pressure of fifteen to one hundred and fifty pounds per square inch to said material and heating to harden said material 2. The method of forming a base on a bulb of vitreous material which consists in placing in a mold surrounding a portion of said bulb a material comprising a synthetic resin, a hardening agent, and a non-compressible filler, and applying pressure of fifteen to one hundred and fifty pounds per square inch to said material and heating to harden said material.

3. An article of manufacture comprising a hollow portion of thin vitreous material and a portion composed of a material comprising a synthetic resin and a non-compressible filler compressed and hardened and firmly gripping said glass portion.

4. An electrical device comprising a bulb of vitreous material and a base composed of a material comprising a synthetic resin and a non-compressible filler compressed and hardened and firmly gripping said bulb.

5. An electrical device comprising a bulb and a base composed of an insulating material and a plurality of rigid conductive protuberances extending from the side of said base and arranged helically.

6. An electrical device comprising a bulb, a leading-in conductor extending from the end thereof and a base composed of insulating material having a plurality of rigid conductive protuberances extending from the side thereof and helically arranged, said leading-in conductor being electrically connected to one of said protuberances.

ROYAL F. STRICKLAND.